April 24, 1962 R. SCHOBER 3,031,274
APPARATUS FOR CATALYTIC HIGH-PRESSURE SYNTHESES
Filed Feb. 6, 1957
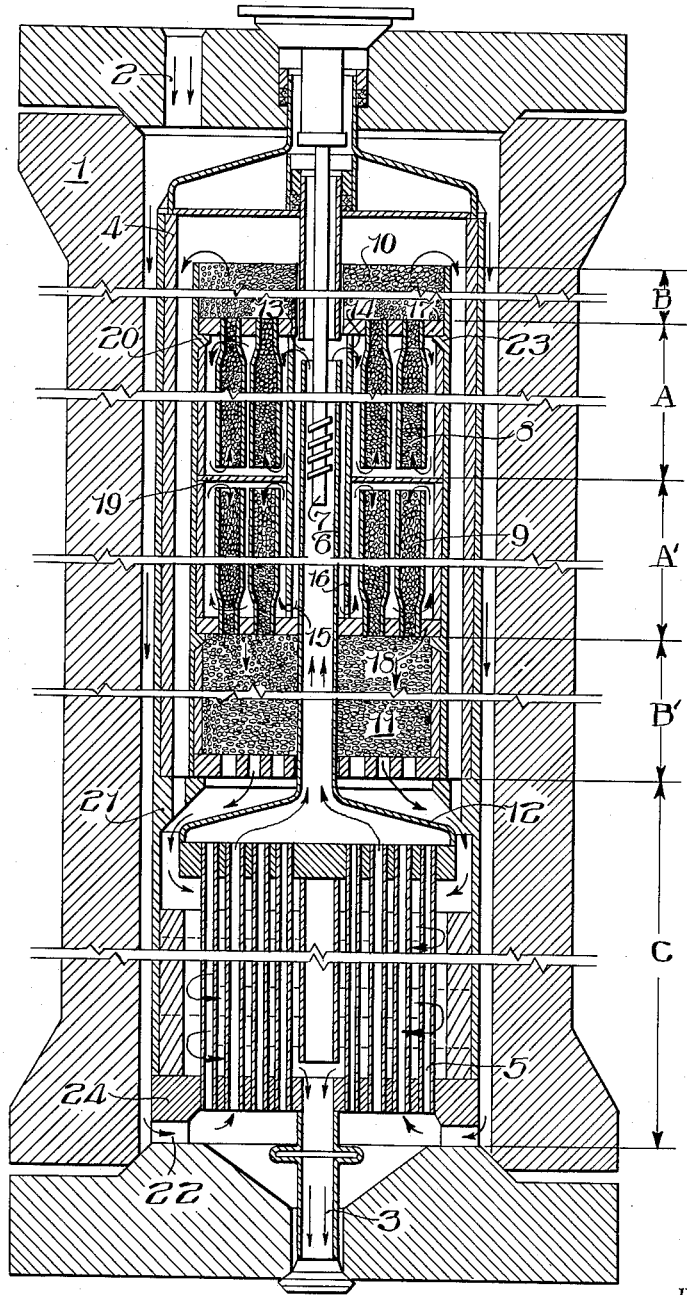
INVENTOR
Robert Schober
BY Connolly and Hutz
ATTORNEYS

United States Patent Office 3,031,274
Patented Apr. 24, 1962

3,031,274
APPARATUS FOR CATALYTIC HIGH-PRESSURE SYNTHESES
Robert Schober, Linz (Danube), Austria, assignor to Friedrich Uhde G.m.b.H., Dortmund, Germany, a corporation of Germany
Filed Feb. 6, 1957, Ser. No. 638,603
4 Claims. (Cl. 23—289)

The present invention relates to a process and apparatus for catalytic high-pressure syntheses for gaseous to vaporous reactants.

Attempts have been made to enlarge catalyst furnaces for the ammonia synthesis as well as for the methanol and benzine syntheses in order to provide for a larger throughput of gas. These attempts meet, however, with the difficulty that by enlarging the furnace the gas travel path is lengthened and an undesirable pressure increase takes place.

By increasing the operating pressure when there is a lengthened path of gas travel and thereby consequently increasing the rate of gas flow, it is still not possible, however, to bring closer together the maxima and minima of temperature. Therefore, even with a pressure increase no proportional increase in the furnace capacity is produced. This applies to all types of furnaces, and particularly to the so-called catalyst-tube furnace which, more than furnaces of other types, has temperatures which are too high in the beginning of the contact space and too low at the end thereof.

Now, I have found that a mixture of gaseous to vaporous reactants which has advantageously been preheated can be conducted in at least two separate partial currents which may be of different strength but are advantageously of equal strength through a catalyst mass placed in a furnace. Each partial current flows through a catalyst arrangement or system. These catalyst systems are suitably situated one above the other in the pressure hull of the furnace and separated from the neighboring system in a gas-tight manner. After the currents have been reacted simultaneously, each in the respective catalyst system, they leave the furnace through a common countercurrent heat exchanger. The catalyst system may either consist of tubes filled with a catalyst mass or of a combination of such tubes and a space above or below these tubes which is filled with a catalyst mass.

The process of the invention can be generally used for carrying out catalytic high-pressure syntheses, particularly the ammonia synthesis as well as the methanol or the benzine synthesis. The pressure range may be wide and is practically unlimited. There are advantageously used pressure ranging from about 200 to about 400 atmospheres, preferably from 300 to 350 atmospheres.

For carrying out the process of the invention, a preferred catalyst furnace is one having a pressure-resistant shell, an inner casing containing tubes which are filled with catalyst and/or spaces below or above these tubes filled with a catalyst mass, and a heat exchanger. In general, two catalyst systems consisting of several tubes containing the catalyst or of a combination of such tubes and spaces below or above these tubes which spaces are filled with catalyst, are suitably arranged one above the other in the pressure hull. The hull consists of a pressure-resistant shell. There is further provided an axial central tube with outlets for the gas in a number corresponding to that of the catalyst systems so that the individual catalyst systems can be charged through the central tube with fresh gas which may be preheated from the common counter-current heat exchanger.

Usually two catalyst systems are used. It is, however, also possible to employ a larger number of systems.

The catalyst furnace can be so constructed that in each of the catalyst systems the length of the travel path of the gas through the catalyst mass is set in such a manner that the total length of these paths is approximately equal to the total length of the travel path of gas through the catalyst mass in a known single catalyst system, i.e. in a catalyst system which is not subdivided.

The catalyst furnace can also be constructed so that the individual catalyst systems which consist of tubes containing the catalyst or of combinations of such tubes and charges of catalyst mass filling the spaces above and below the tubes, are arranged one above the other in the pressure hull of the catalyst furnace either in the same position or in a mirror-image position in order to facilitate the feed of the arriving gas current to be used for the synthesis.

The single FIGURE of the drawing shows a section of the furnace of the present invention. Referring now only generally to the drawing:

In order to facilitate the insertion and removal of the catalyst system into and out of the catalyst furnace, each particular catalyst system (in sections A, B or A', B' of the drawing) may be supported on brackets 23 provided on the guide tube 20.

The catalyst furnace can further be constructed so that the guide tube 20 containing the catalyst systems rests with its lower end on separate brackets 21 or an annular bracket arranged at the inner side of the inner casing 4 of the furnace, the annular bracket being provided with openings for the gas. According to a special construction of the furnace of the invention, the inner casing 4 containing the catalyst system (A, A', B, B') may be provided with claws at its upper end to be suspended in recesses or on brackets at the inner wall of the pressure hull 1. Furthermore, the catalyst systems (A, A', B, B') suspended in the guide tube may rest with an extension piece of the guide tube on the bottom 24 of the heat exchanger 5. For this purpose, the bottom is constructed so as to extend to the external diameter of the guide tube. Bottom 24 furthermore rests on the bottom of the pressure hull 1 and is provided with openings for the gas 22.

In the operation of catalyst tube furnaces or combined furnaces, especially those of excessively large dimensions, for example of a diameter of 1000 mm. and a height of 18 m., the present invention due to the lengthened path of gas travel enables the pressure increase and the consequent pressure loss to be eliminated. On the other hand it makes it possible in a substantially complete manner to bring together the maxima and minima in temperature—which are inevitable in the known apparatus—due to the lengthened path of gas travel. Consequently, the furnace capacity is highly improved. The process of the invention thus enables the catalyst tube system, which has proved useful with a view to the adjustment of temperature, to be used even at an increased throughput of gas and in excessively large furnaces.

It is a characteristic feature of the present invention to subdivide the path of the gas travel and consequently the catalyst systems for the main reaction as well as those for the final reaction. With this arrangement, the gas takes a smoother course into individual groups which are connected in parallel regarding operation. The travel paths are shorter regarding the path of the gas travel through the catalyst mass so that the pressure under which the fresh gas for the synthesis is introduced is subdivided into approximately equal and correspondingly reduced partial pressures at each given place of the reaction, depending on the number of the catalyst systems connected in parallel with regard to the operation. The effect of this measure is clearly understood when taking into consideration that every increase is gas velocity, i.e. particularly in excessively large furnaces for an especially large throughput of gas, is bound to disturb the proportion of gas velocity, residence time, gas pressure and yield, which proportion depends on the reaction velocity in the catalyst used. With a given and constant efficacy of a catalyst for a given chemical process, however, the above-mentioned values can be varied only within certain narrow limits without shortcomings occurring, for example overheating, excess pressure due to increased resistance, poor yield or non optimum utilization of the reaction space.

It is an object of this invention to avoid these difficulties and to improve the working conditions of furnaces of normal size or to enable an optimum operation of excessively large furnaces. This can be achieved according to the invention by subdividing a single gas path of travel in the furnace which can be pyrometrically controlled only with difficulty into two or more travel paths of equal function each of which fulfills the requirements as to gas resistance, gas velocity, reaction temperature, utilization of space etc. depending on the reactability of the catalyst used and the yield desired, without any alteration of the size of the furnace being necessary. In most cases complicated additional cooling devices for certain parts of the furnace, which cooling devices are difficult to attend to, can be dispensed with.

An apparatus suitable for use in carrying out the process of the invention is illustrated diagrammatically in the single FIGURE of the accompanying drawing. For the sake of completeness, there is represented a combined furnace provided with catalyst tubes as well as spaces below or above the tubes which spaces are filled with catalyst mass. For the same reason, details which are known in themselves are likewise shown in the drawing.

The invention is, however, not limited to a furnace comprising catalyst tubes and spaces below and above these tubes which spaces are filled with catalyst mass as shown in the drawing. It is also applicable, for example, to a furnace in which the catalyst is arranged around the tubes. It is also possible to install more than two catalyst systems.

Referring specifically to the single FIGURE of the drawing:

The drawing represents a high-pressure furnace which comprises a pressure hull 1 with inlet and outlet openings 2 and 3 respectively for the gas, an inner casing 4, a recuperative heat-exchanger 5, a central conduit 6 and a burner 7. The high-pressure furnace further comprises tubes 8 and 9 filled with catalyst and spaces 10 and 11 above and below the tubes which spaces are filled with catalyst mass. The current of fresh gas introduced from heat exchanger 5 through a collector 12 is passed into the central conduit 6 in which the burner 7 is located. The central conduit 6 is provided with outlet openings 13 through which the preheated fresh gas proceeds into a counter-current tube 16 which is provided above and below burner 7 with outlets 14 and 15 for the gas. Through these outlets in each case one of the combinations of catalyst-containing tubes and a space filled with catalyst mass is supplied with fresh gas. If the furnace is divided into several individual catalyst systems, a corresponding greater number of outlet openings for the gas are provided in the counter-current tube 16. These partial currents from tube 16 strike the catalyst-containing tubes 8 and 9 of the groups of tubes in sections A and A' at the narrowest section of these tubes near the place where they are attached to the tube bottom and at which place the highest temperature prevails. The partial currents then enter the catalyst tubes at the opposite open end and leave them through tube supports 17 and 18 in A and A' respectively and pass through spaces 10 and 11 filled with catalyst mass for slow final reaction of residues of the gas of the synthesis.

Sections A and B are separated in gas-tight manner from sections A' and B' by a partition wall 19 which extends from the counter-current tube 16 to the wall 20 of the catalyst system. The partial currents of reacted gas meet above collector 12 of the heat exchanger, pass through the latter while giving off heat and proceed through exit 3 to be condensed.

It is not absolutely necessary that the groups of catalyst tubes in sections A and A' which tubes are connected in parallel as regards their operation are constructed so as to send the gas current in opposite direction, although this has proved to be the simplest construction. While simultaneously changing the position of the upper outlet 14 for the gas in tube 16, the upper catalyst tubes 8 in section A, for example, may be arranged in opposite direction so that the partial gas currents travel in the same direction.

If in an excessively large furnace operating under a pressure of 300 atmospheres (gauge), as are used in the benzine or ammonia synthesis, the path of travel of the gas is subdivided according to the invention, a daily yield of 190 to 220 metric tons of ammonia or a corresponding yield of benzine can be obtained.

When subdividing the reactive system of high-pressure furnaces according to the invention, the building in and removal of the members to be inserted in the furnace is advantageously facilitated by certain improvements. For example, the inner casing 4 can be equipped at an appropriate place with brackets 21 or an annular bracket provided with a sufficient number of openings for the reacted gases from sections A and B, these brackets or bracket supporting the catalyst apparatus A(B) and A'(B'). In this manner the heat exchanger C is relieved from the high weight of the catalyst apparatus.

The catalyst systems A(B) or A'(B') are advantageously so constructed that in each case an upper part, arranged above a lower part, rests on brackets provided at the inner wall of the inner casing or the guide tube 20.

It is also possible to provide the inner casing 4 at its upper end with claws (not shown in the drawing) and to insert it in recesses or to support it on brackets arranged at the inner wall of pressure hull 1, so that the whole catalyst apparatus A(B), A'(B') of the furnace is suspended therefrom without loading the heat exchanger with its weight.

Furthermore, the whole catalyst apparatus A(B), A'(B') supported on brackets 21 may rest with an extension-piece of the guide tube 4 on the lower bottom 24 of the heat exchanger C, which bottom has been extended for this purpose. The bottom 24 itself rests on the bottom of the pressure hull 1 and is provided with a sufficient number of openings 22 for the gas.

Obviously many modifications and variations of the present invention are possible in the light of the above teachings. It is, therefore, to be understood that within the scope of the appended claims the invention may be practiced otherwise than as specifically described.

I claim:

1. A catalyst furnace for catalytic high pressure synthesis which comprises a pressure resistant shell, an inner casing supported within said shell which terminates below the top of said shell, a top cover for said casing, said casing extending substantially to the bottom of said shell and being of smaller cross section than the shell whereby a peripheral channel is formed by the shell and casing, an entrance port extending through the top of the shell for introducing fresh gaseous reactants into the shell and said peripheral channel, a heat exchanger supported within the lower portion of said casing, said exchanger including a plurality of spaced apart conduits through which the fresh gaseous reactants pass, ports extending through the bottom portion of the casing whereby the fresh gaseous reactants can pass from said peripheral channel into and through the heat exchanger conduits, a collector housing supported over the top of said heat exchanger unit for collecting the fresh and heated gaseous reactants as they are discharged from the conduits of the heat exchanger, a central conduit connected with said collecting housing in such a manner that it extends upwardly centrally of the casing and terminates at a point below the top of said casing, said central conduit receiving the fresh heated gaseous reactants from the collector housing, said central conduit being open at its upper end, a burner extending through the top of said pressure resistant shell and casing top to a position within said central conduit, a counter-current tube in external concentric relation to said central conduit, ports extending through said counter-current tube, at least two catalyst systems supported around said counter-current tube and in communication with said ports of said counter-current tube, each catalyst system consisting of several tubes filled with catalyst material with the total cross section of said catalyst systems being smaller than the interior cross section of said casing whereby an inner peripheral channel is formed within the casing which receives the heated and reacted gases issuing from a catalyst system, a passageway communicating with said inner channel and with the discharge end of at least one other catalyst system for leading the heated and reacted gases into the heat exchanger around and between the spaced apart conduits of the heat exchanger in counter-current manner to the fresh gaseous reactants passing through the conduits, and a discharge port connected with the heat exchanger and extending through the bottom wall of said shell for discharging the reacted gases from the shell interior.

2. A catalyst furnace according to claim 1 wherein compartments which are filled with catalytic material and which communicate with the discharge end of the catalyst systems are provided immediately above and below said systems.

3. A catalyst furnace as claimed in claim 1 wherein the catalyst systems are arranged one above the other in the casing.

4. A catalyst furnace as claimed in claim 1 wherein two individual catalyst systems are arranged in mirror image position in the pressure shell of the catalyst furnace.

References Cited in the file of this patent

UNITED STATES PATENTS

| | | |
|---|---|---|
| 1,779,092 | Horter | Oct. 21, 1930 |
| 1,910,365 | Richardson | May 23, 1933 |
| 1,932,247 | Kniskern | Oct. 24, 1933 |
| 1,980,718 | Edmonds | Nov. 13, 1934 |
| 2,861,873 | Worn | Nov. 25, 1958 |
| 2,887,365 | De Rycker et al. | May 19, 1959 |
| 2,910,350 | Jean | Oct. 27, 1959 |

FOREIGN PATENTS

| | | |
|---|---|---|
| 661,456 | France | July 25, 1929 |
| 178,631 | Austria | May 25, 1954 |
| 43,725 | Norway | Feb. 21, 1927 |